May 5, 1942. J. DAHLE 2,282,037
PROCESS OF PRODUCING A GRANULAR PRECIPITATE FROM A COLLOIDAL SOLUTION
Filed Oct. 26, 1938
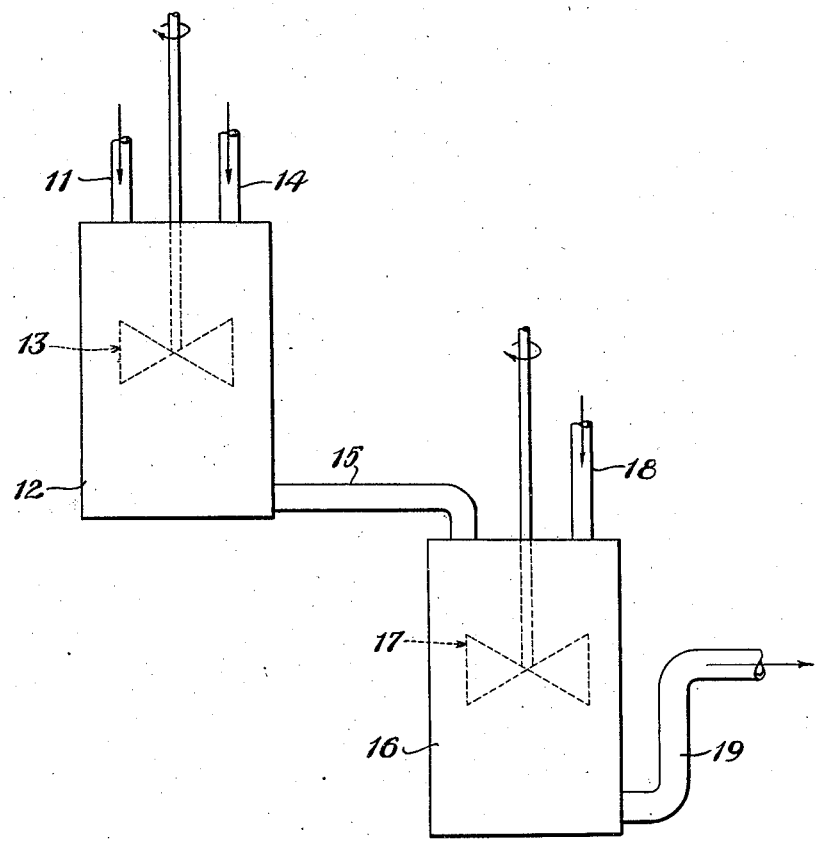
INVENTOR:
Joseph Dahle
By Dike, Calver & Gay
Attys Patented May 5, 1942

2,282,037

UNITED STATES PATENT OFFICE 2,282,037

PROCESS OF PRODUCING GRANULAR PRECIPITATES FROM COLLOIDAL SOLUTIONS

Joseph Dahle, Springfield, Mass., assignor to Monsanto Chemical Company, St. Louis, Mo., a corporation of Delaware Application October 26, 1938, Serial No. 237,044

11 Claims. (Cl. 260—73)

The present invention relates to the production of granular precipitates of certain materials of which polyvinyl acetal resins, cellulose esters and the like are examples, which are capable of forming colloidal solutions and being precipitated therefrom, in a disintegrated condition. In the manufacture of these materials, it is important for their economical subsequent use that they be in a granular state, that they be free from chemicals or solvents employed in the course of their manufacture, and that the liquor from which the granular precipitate is removed, be as concentrated as possible to facilitate recovery of chemicals or solvent. It is also important that the material be in such condition that it can be washed free of chemicals or solvents employed in the course of their manufacture, and without loss of the material itself so that the process will produce a high yield. The precipitates produced by the hereindescribed process appear to have an open porous cellular structure with minimum of impervious skin and therefore are particularly adaptable to subsequent treatment, such as washing, re-solution and chemical treatments.

While the process embodying my invention is particularly applicable to the manufacture of polyvinyl acetal resins, such for instance, as are described in the patent to Morrison, Skirrow and Blaikie, Reissue No. 20,430, the process is also applicable to other substances which are capable of forming colloidal solutions and are capable of being precipitated therefrom.

It is known that a solid substance dispersed in a solvent to form a colloidal solution can be precipitated from that solution by the addition of a miscible non-solvent. In the case of many materials it is extremely difficult to regulate either the size or structure of the precipitated particles.

My invention is based on the discovery that particles of the required character can be produced by a certain definite procedure relating to the introduction of the miscible non-solvent.

In accordance with my invention, I mix, as a first stage, and preferably while stirring or beating vigorously, a colloidal solution and a miscible non-solvent or precipitant in such a ratio that the resin is near the point of incipient precipitation; and then as a second stage while the stirring or beating is continued add more non-solvent or precipitant. By proper regulation of the proportion of the non-solvent in each of the two stages, and of the stirring, I find that the character and size of the grains produced can be controlled, and that very porous grains capable of easy purification may be produced.

While the matter may not be capable of accurate determination and is perhaps merely theory which may not be correct, I believe that in the first stage the concentration of solvent and non-solvent in the mix is such that a gel is formed, that the vigorous stirring separates the gel into particles which if the stirring ceased would coalesce since they are a gel, and that the increase of non-solvent concentration in the second stage sets the particles of gel in substantially their original size and form by precipitating the resin out of the gel, and that since the grains are no longer a gel they do not thereafter tend to coalesce or reagglomerate.

The relative importance of stirring in the two stages seems to vary with the character of the gel which is being formed into particles. In the case of a relatively hard gel the particles of which in the first stage would recoalesce only if allowed to stand for several minutes, the stirring in the first stage largely determines the size of the grain while the stirring in the second stage is of secondary importance. In the case of a very soft gel however the particles of which are likely to coalesce in a very short time, possibly in the fraction of a second, the stirring action in the second stage plays a much more important part in determining the size of the grain which will be formed.

In practice, this procedure is accomplished by continuously combining as the first stage, a stream of the resin solution and a stream of the non-solvent in a mixer, conveniently called the first mixer, in which the two streams are completely mixed and vigorously stirred, the size of the two streams being carefully adjusted so that the concentration of the precipitant in the resulting mixture is just below the point of incipient precipitation; and at the same time and as a second stage, discharging the mixture continuously into contact with a second stream of the precipitant in a second mixer in which the concentration is brought below the point where coalescence would otherwise take place.

It will be understood that, as far as solvent concentration is concerned, the essential factor is the maintenance of a proper ratio between the solvent and non-solvent or precipitant, and that it is not necessary that the colloidal solution which is to be precipitated shall be free from non-solvent, or that the non-solvent which is used as a precipitant shall be entirely free from solvent, it only being necessary that the mixture in the first stage have the non-solvent concentration necessary to bring the colloid near the precipitation point and in the second stage be great enough to fix the precipitate in substantially the form given to it in the preceding stage.

The invention will be described in connection with the manufacture of two granular precipitated polyvinyl acetal resins, the resins having been made initially, one with formaldehyde and the other with butyraldehyde.

In the drawing, I have illustrated diagrammatically a simple apparatus for practicing my invention. In the drawing the first mixer is indicated at 12, the resin solution being introduced at 11. Within the first mixer 12 is a power operated stirring or beating device 13. The precipitant is introduced at 14 as will be hereinafter explained. The amount of precipitant or non-solvent with respect to the resin solution is carefully regulated. In the first mixer 12 the resin is brought to the stage of incipient precipitation, i. e. the point where precipitation of the resin out of the gel is just about to begin or possibly has begun to some extent. The mixture, after having been beaten vigorously as described, is then discharged through the pipe 15 into the second mixer 16. This mixer is similar to the first and contains a stirrer 17 and receives additional precipitant through the pipe 18. In this mixer the particles of what I believe to be gel formed in the first mixer are hardened by addition of more non-solvent while in agitation to remove the tendency to agglomeration or coalescence.

To manufacture a granular polyvinyl acetal resin made with formaldehyde, I proceed as follows:

I use a resin made with formaldehyde which may be considered to be made up of 82% of acetal, 8% hydroxyl groups figured as polyvinyl alcohol and 10% acetate. This resin I mix in the proportion of 12 parts of resin to 60 parts of acetic acid and 40 parts of water. Such a mixture forms a colloidal solution. The resin in such a mixture will remain in solution unless the acid concentration is reduced below about 50% by addition of water or other miscible non-solvent. When the acid concentration is reduced to about 35% to 45%, for example, by the addition of about 50 parts more of water which reduces the acid concentration to about 38%, the resin reaches the point of incipient coagulation and if the solution is stirred, the resin begins to break up into definite particles but tends to coalesce again when the stirring is discontinued. A further non-solvent is added to reduce the acid concentration still lower and when the concentration is reduced to about 25%, the resin can be drained, water added and the resin washed by stirring without recoalescing. However, if it is desired that the resin be centrifuged, it is necessary to reduce the acid concentration below about 15%. Accordingly, I introduce the stream of resin solution through the pipe 11 and the precipitant (water) through the pipe 14 into the first mixer in such proportion that there will be about 50 parts of water to each 112 parts of resin solution in the first stage. In the second stage, I add about 25 parts more of water. If it is desired to harden the grain sufficiently to withstand a fair compression without caking, then about 75 parts more water should be added.

If it is desired to make a granular precipitate from a solution of polyvinyl acetal resin made initially with butyraldehyde, I take a resin which contains 2% or less of acetate, 16 to 20% hydroxyl groups figured as polyvinyl alcohol, and the balance acetal formed with butyraldehyde. This resin is mixed with alcohol and water in the ratio of 12 parts of resin, 80 parts of alcohol and 20 parts of water, making 112 parts in all. In the first stage of precipitation I add about 25 parts of water and in the second stage I add about 30 parts more of water. To produce a non-caking resin, from 150 to 200 additional parts of water may be added.

While in the two foregoing examples, the precipitation of polyvinyl acetal resins is described and the precipitant or non-solvent employed is water, it will be understood that my process is not limited to these resins or even to resins nor to the solvents or non-solvents mentioned since the process is applicable to a great variety of substances capable of forming colloidal solutions and being precipitated therefrom by non-solvents or precipitants. It will be understood that, if desired for any reason, the granular precipitate may be redissolved and again precipitated, the process being repeated for as many times as may be required to obtain the desired purity or quality of the final product.

While I have shown in the drawing a mechanical stirrer as the means for giving the mixture the treatment which appears necessary to produce the proper granular condition, I do not limit myself to the use of a mechanical stirrer since it is possible that under proper conditions the stirring and consequent breaking up of the gel in the first stage may be accomplished by the violent injection and mingling of the two streams. Also, while I prefer to carry out my process by the mixing of two streams as a continuous process, it is obvious that the same results may be accomplished by treatment of the resin solution in batches.

I claim:

1. A process of producing granular precipitates of porous structure from colloidal solution of polyvinyl acetal resin which comprises mixing colloidal solution of polyvinyl acetal resin with sufficient precipitant to effect a gelling of said polyvinyl acetal resin while dispersing the gelatinous material thus formed into substantially finely divided coalescible gelatinous particles by agitation, and, before coalescence of said gelatinous particles, treating said particles with a sufficiently high concentration of precipitant for a sufficient length of time to render them substantially permanently discrete, while maintaining said particles in separated condition by agitation.

2. A process of producing granular precipitates of porous structure from a colloidal solution of polyvinyl acetal resin which comprises mixing in a first zone colloidal solution of polyvinyl acetal resin with sufficient precipitant to effect a gelling of said polyvinyl acetal resin while dispersing the gelatinous material thus formed into substantially finely divided coalescible gelatinous particles by agitation, and, before coalescence of said gelatinous particles, passing the resulting mixture to a second zone and therein treating said particles with a sufficiently high concentration of precipitant for a sufficient length of time to render them substantially permanently discrete, while maintaining said particles in separated condition by agitation.

3. A process of producing granular precipitates of porous structure from a colloidal solution of polyvinyl acetal resin which comprises mixing in a first zone colloidal solution of polyvinyl acetal resin with sufficient precipitant to effect a gelling of said polyvinyl acetal resin while dispersing the gelatinous material thus formed into substantially finely divided coalescible gelatinous particles by agitation, and, before coalescence of said gelatinous particles, passing the resulting mixture to a second zone and therein treating said particles with a sufficiently increased concentration of precipitant for a sufficient length of time to render them substantially permanently discrete, while maintaining said particles in separated condition by agitation.

4. A process of producing granular precipitates of porous structure from a colloidal solution of polyvinyl acetal resin which comprises mixing a stream of colloidal solution of polyvinyl acetal resin with a stream of sufficient precipitant to effect a gelling of said polyvinyl acetal resin while dispersing the gelatinous material thus formed into substantially finely divided coalescible gelatinous particles by agitation, and, before coalescence of said gelatinous particles, treating said particles with a sufficiently high concentration of precipitant for a sufficient length of time to render them substantially permanently discrete, while maintaining said particles in separated condition by agitation.

5. A process of producing granular precipitates of porous structure from a colloidal solution of polyvinyl acetal resin which comprises mixing in a first zone a stream of colloidal solution of polyvinyl acetal resin with a stream of sufficient precipitant to effect a gelling of said polyvinyl acetal resin while dispersing the gelatinous material thus formed into substantially finely divided coalescible gelatinous particles, passing the resulting mixture to a second zone and therein contacting it with a second stream of precipitant and thereby treating said particles with a sufficiently increased concentration of precipitant for a sufficient length of time to render them substantially permanently discrete, while maintaining said particles in separated condition by agitation.

6. A process of producing granular precipitates of porous structure from a colloidal solution of polyvinyl acetal resin which comprises mixing in a first zone colloidal solution of polyvinyl acetal resin with sufficient water to effect a gelling of said polyvinyl acetal resin while dispersing the gelatinous material thus formed into substantially finely divided coalescible gelatinous particles by agitation, and, before coalescence of said gelatinous particles, passing the resulting mixture to a second zone and therein treating said particles with a sufficiently increased concentration of water for a sufficient length of time to render them substantially permanently discrete, while maintaining said particles in separated condition by agitation.

7. A process of producing granular precipitates of porous structure from a colloidal solution of polyvinyl acetal resin made with butyraldehyde, said solution being in alcohol, which comprises mixing in a first zone colloidal solution of polyvinyl acetal resin with sufficient water to effect a gelling of said polyvinyl acetal resin while dispersing the gelatinous material thus formed into substantially finely divided coalescible gelatinous particles by agitation, and, before coalescence of said gelatinous particles, passing the resulting mixture to a second zone and therein treating said particles with a sufficiently increased concentration of water for a sufficient length of time to render them substantially permanently discrete, while maintaining said particles in separated condition by agitation.

8. A process of producing granular precipitates of porous structure from a colloidal solution of polyvinyl acetal resin made with butyraldehyde, said solution comprising about 12 parts of polyvinyl acetal resin, 80 parts of alcohol, and 20 parts of water, which comprises mixing in a first zone said colloidal solution with about 25 parts of water to effect a gelling of said polyvinyl acetal resin without precipitation while dispersing the gelatinous material thus formed into substantially finely divided coalescible gelatinous particles by agitation, and, before coalescence of said gelatinous particles, passing the resulting mixture to a second zone and therein treating said particles with a sufficiently increased concentration of water for a sufficient length of time to render them substantially permanently discrete, while maintaining said particles in separated condition by agitation.

9. A process of producing granular precipitates of porous structure from a colloidal solution of polyvinyl acetal resin made with formaldehyde, said solution being in acetic acid and water and the acid concentration being upwards of 50%, which comprises mixing said colloidal solution of polyvinyl acetal resin with sufficient water to reduce acid concentration to between 35 and 40% and thereby effecting a gelling of said resin while dispersing the gelatinous material thus formed into substantially finely divided coalescible gelatinous particles by agitation, and, before coalescence of said gelatinous particles, treating said particles with a sufficiently high concentration of water for a sufficient length of time to render them substantially permanently discrete, while maintaining said particles in separated condition by agitation.

10. A process of producing granular precipitates of porous structure from a colloidal solution of polyvinyl acetal resin made with formaldehyde, said solution consisting of about 12 parts of resin, 60 parts of acetic acid, and 40 parts of water, which comprises mixing said colloidal solution of polyvinyl acetal resin with about 50 parts more of water to reduce the acid concentration to about 38% and thereby effecting a gelling of said resin while dispersing the gelatinous material thus formed into substantially finely divided coalescible gelatinous particles by agitation, and, before coalescence of said gelatinous particles, treating said particles with a sufficiently high concentration of water for a sufficient length of time to render them substantially permanently discrete, while maintaining said particles in separated condition by agitation.

11. A process of producing granular precipitates of porous structure from a colloidal solution of polyvinyl acetal resin made with formaldehyde, said solution being in acetic acid, which comprises mixing said colloidal solution of polyvinyl acetal resin with sufficient precipitant to effect a gelling of said resin while dispersing the gelatinous material thus formed into substantially finely divided coalescible gelatinous particles by agitation, and, before coalescence of said gelatinous particles, treating said particles with a sufficiently high concentration of precipitant for a sufficient length of time to render them substantially permanently discrete, while maintaining said particles in separated condition by agitation.

JOSEPH DAHLE.